United States Patent Office 2,970,967
Patented Feb. 7, 1961

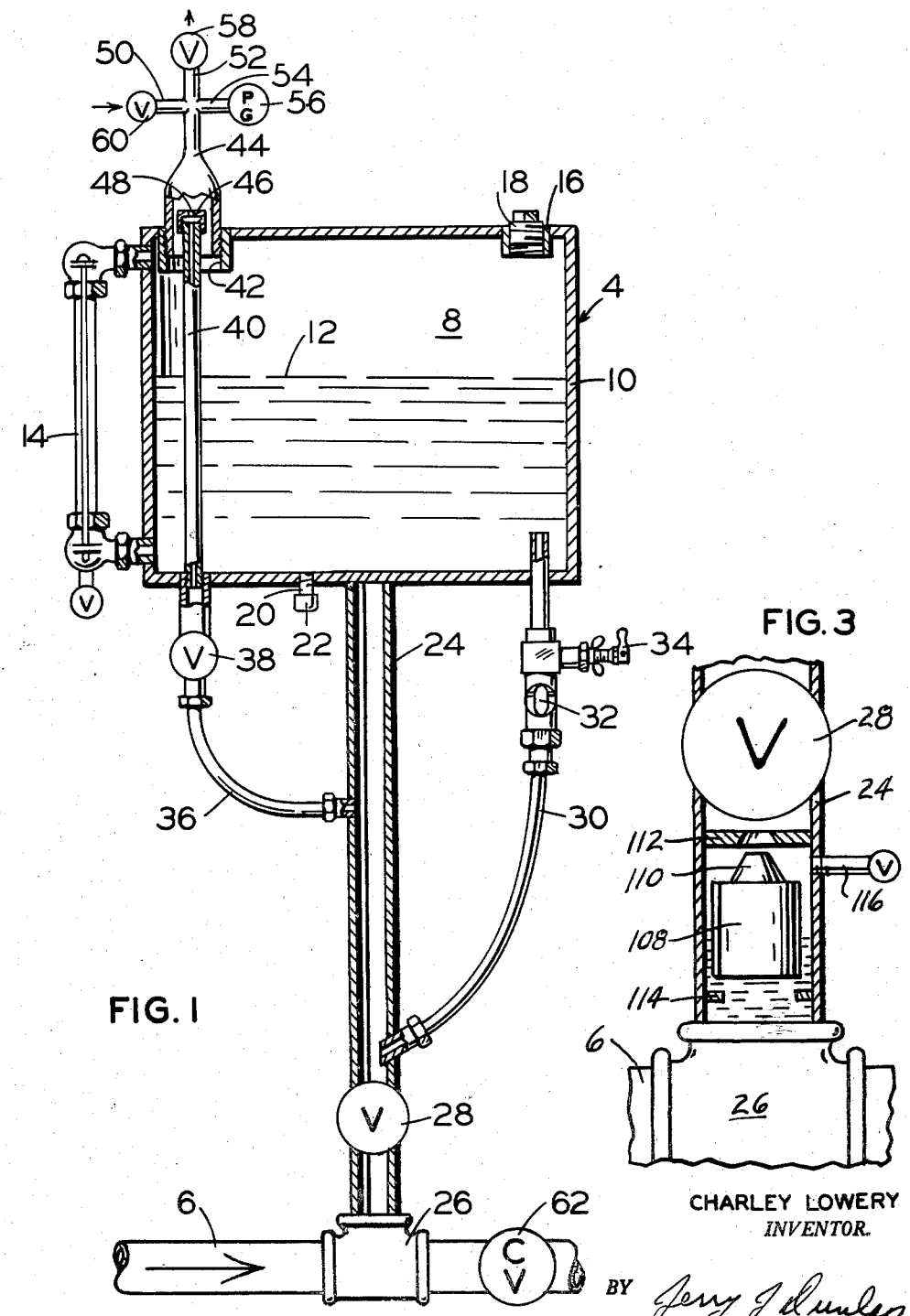

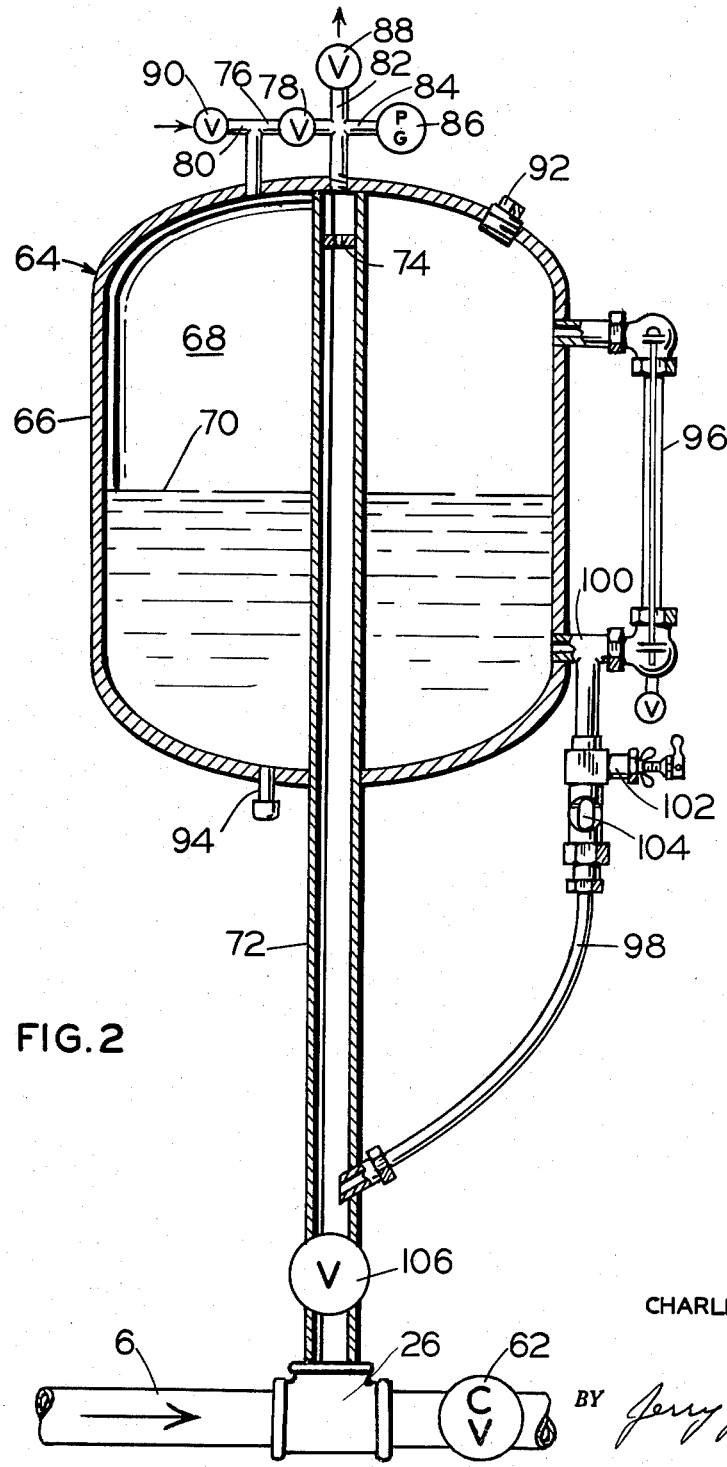

2,970,967

EMULSION BREAKER INJECTOR

Charley Lowery, Rte. 8, Box 153, Oklahoma City, Okla.

Filed Aug. 28, 1958, Ser. No. 757,759

4 Claims. (Cl. 252—360)

This invention relates generally to the art of producing oil wells, and more particularly, but not by way of limitation, to an improved device for injecting an emulsion breaker into the fluid mixture produced by an oil well.

As it is well known in the art, most oil wells produce a combination of oil, water and gas, with a large proportion of the oil and water being in the form of an emulsion. The water component of the well fluids is normally considered a useless product, and it is highly desirable to remove the water prior to storage and further processing of the oil. It is also well known in the art that the great majority of oil wells requiring an artificial lifting system are pumped by means of a reciprocating sucker rod type pump. This type of pumping mechanism tends to thoroughly mix the oil and water flowing into the well bore from the various producing strata, and enhances the emulsification of the oil and water.

In view of the above described problem, it is common practice to inject a suitable emulsion breaker into the well fluids in the vicinity of the well head to facilitate separation of the oil and water at a remotely located oil and water separating apparatus. At the present time the emulsion breaker is usually injected into the flow line by means of a small gear pump (or sometimes a reciprocating pump) actuated by the surface power unit which operates the well pump. The injection pump is usually positioned on the ground in front of the surface power unit and is operated by a rod or wire extending downwardly to the pump from the walking beam of the surface power unit. These injection pumps ordinarily have a limited reservoir for containing a supply of the emulsion breaker, and they frequently get out of order due to their constant operation and inherently delicate structure; thereby requiring frequent servicing and repair.

The present invention contemplates a novel device for injecting an emulsion breaker into the fluids produced by one or more oil wells without the use of moving parts. More specifically, the present invention contemplates a fluid-tight reservoir of emulsion breaker supported physically above a flow line through which the oil well fluids are pumped. The top portion of the reservoir is placed in communication with a reservoir of gas obtained from the produced well fluids to maintain the pressure in the top portion of the reservoir above the level of the emulsion breaker at least equal to the pressure of the well fluids flowing through the flow line. Simultaneously, the emulsion breaker is dripped into the flow line through a separate valve controlled conduit to provide a constant injection of the emulsion breaker into the mixture of well fluids. Normally, a sufficient amount of free gas will be present in the well fluids to maintain the flow line pressure on the top surface of the emulsion breaker without the oil and water components of the well fluids entering the emulsion breaker reservoir and diluting the emulsion breaker. However, the present invention also contemplates the use of a separate supply of gas to maintain a pressure on the top surface of the emulsion breaker to in turn provide a more positive feed of the emulsion breaker into a flow line. The pressure of gas injected into the top portion of the reservoir may be as high as desired, but is preferably at least slightly higher than the flow line pressure in a system where the well fluids do not contain an appreciable amount of free gas, to assure that flow between the reservoir and the flow line will be in a direction to inject the emulsion breaker into the flow line at the desired rate.

An important object of this invention is to provide a device for injecting emulsion breaker into well fluids being forced through a flow line which will have an extended service life and will require a minimum of attention by operating personnel.

Another object of this invention is to provide a device for injecting an emulsion breaker into well fluids which provides a positive flow of the emulsion breaker into the well fluids, without the use of moving parts in the device.

A further object of this invention is to provide an emulsion breaker injecting device operated by gas pressure wherein the emulsion breaker will not be diluted by the fluid into which the emulsion breaker is normally injected.

Another object of this invention is to provide an emulsion breaker injector wherein the emulsion breaker reservoir may be easily cleaned without the loss of any of the emulsion breaker which may be entrained or mixed with sediment in the bottom of the reservoir.

A still further object of this invention is to increase the economy of separating the oil and water components of fluids produced from oil wells.

Other objects and advantages of the invention will be evident from the following detailed description, when read in conjunction with the accompanying drawings which illustrate my invention.

In the drawings:

Figure 1 is a vertical sectional view, with portions shown in elevation, of an emulsion breaker injector constructed in accordance with this invention.

Figure 2 is a vertical sectional view of a modified emulsion breaker injector.

Figure 3 is a further modification which may be used to prevent a back flow of well fluids into the emulsion breaker storage.

Referring to the drawings in detail, and particularly Fig. 1, reference character 4 generally designates an injecting apparatus mounted on a flow line 6 through which the fluid mixture produced from one or more oil wells is being pumped to a suitable separating apparatus (not shown). It may be noted here that although it is contemplated to position the apparatus 4 adjacent a well head and inject emulsion breaker into the well fluids produced from a particular well, it will be understood that the apparatus 4 may be installed in any other suitable location, such as in a gathering system serving several producing wells; providing, of course, the apparatus 4 is installed upstream of the equipment in which the oil and water in the well fluids are separated, in order that the emulsion breaker injected by the apparatus 4 will facilitate the separation of the oil and water.

The injector 4 comprises a closed chamber 8 formed by any suitably shaped housing 10, and preferably a cylindrically-shaped housing to facilitate the construction thereof. The chamber 8 is provided to receive a supply of any suitable type of emulsion breaker 12 which will facilitate the separation of the oil and water components of a well mixture and discourage the formation of an oil and water emulsion in the well fluid. A suitable sight glass 14 is mounted on one side of the housing 10 and communicates at its upper and lower ends with the upper and lower ends, respectively, of the chamber 8 to provide a continuous visual indication of the level of emulsion breaker 12 in the chamber 8. Also, an inlet 16 is provided in the top wall of the housing 10 for filling the chamber 8 with the emulsion breaker 12, and the inlet 16 is normally closed by a threaded plug 18 with a fluid tight connection to prevent loss of pressure from the upper portion of the chamber 8 above the level of the emulsion breaker 12, as will be more fully hereinafter set forth. Emulsion breaker may be drained from the chamber 8 through a suitable outlet 20 normally closed by a plug 22. The housing 10 is supported by a vertically extending pipe 24 which may be suitably welded or otherwise rigidly connected to the bottom wall of the housing 10. The pipe 24 may be of such a size that it can be threaded into a T 26 interposed in the flow line 6, whereby communication is established between the flow line 6 and the pipe 24. I prefer to interpose a suitable valve 28 in the pipe 24 a short distance above the lower end of the pipe for purposes as will be described.

The emulsion breaker 12 is fed into the flow line 6 through a suitable conduit 30 and the lower end portion of the pipe 24. The conduit 30 extends upwardly through the bottom wall of the housing 10 a relatively short distance, such that any sediment which may collect in the bottom of the chamber 8 will not flow into the upper end of the conduit 30 and possibly plug-up the conduit. A suitable sight glass 32 and needle valve 34 are interposed in the conduit 30 to control and provide a visual check of the amount of emulsion breaker 12 being fed into the flow line 6. The needle valve 34 may be adjusted as desired, with the valve normally being open to such an extent that the emulsion breaker 12 may drip through the conduit 30 and then drain through the lower end portion of the pipe 24 in the flow line 6.

As previously indicated, the fluids produced from an oil well will normally contain at least some free gas. The present invention contemplates the use of a portion of this free gas to equalize the pressure in the chamber 8 above the level of the emulsion breaker 12 with the pressure in the flow line 6 to induce a downward flow of the emulsion breaker through the conduit 30 and on into the flow line 6. A conduit 36 extends from an intermediate portion of the pipe 24 (above the connection of the conduit 30) into communication with the bottom of the chamber 8. Also, a suitable valve 38 is preferably interposed in the conduit 36 to prohibit communication from the pipe 24 through the conduit 36 into the chamber 8 when desired. In the normal operation of the injector 4, the valve 38 will be open to provide free communication through the conduit 36.

A riser 40, preferably in the form of a relatively small diameter pipe, extends from the upper end of the conduit 36 through an opening 42 in the top wall of the housing 10. The lower end of the riser 40 is preferably threaded into the upper end of the conduit 36 to convey gas flowing upwardly in the conduit 36 through the chamber 8 and discharge this gas into a bell-shaped cover 44 threadedly secured in the opening 42 loosely round the upper end portion of the riser 40. It will also be noted that a cap 46 is secured on the upper end of the riser 40 and is provided with a relatively small orifice 48 therein to restrict communication between the riser 40 and the cover 44. The orifice 48 is of sufficient size for the efficient transmission of gas therethrough, but is sufficiently small to discourage the upward flow of any liquid through the cap 46 under certain operating conditions, as will be described. I prefer to form the orifice 48 about 1/8 of an inch or less in diameter.

Three branches 50, 52 and 54 communicate with the upper end portion of the cover 44. A suitable pressure guage 56 is secured on the branch 54 to provide a visual indication of the pressure in the upper end portion of the chamber 8, and a suitable valve 58 is secured in the branch 52 to bleed off an excess pressure which may be developed in the upper end portion of the chamber 8, or to relieve the pressure in the upper end portion of the chamber 8 when the chamber is being filled with emulsion breaker 12 through the inlet 16. The branch 50 is provided for the purpose of increasing the pressure in the top of chamber 8 when, for example, an insufficient supply of free gas is available in the well fluids flowing through the line 6, or when it is desired to increase the amount of emulsion breaker 12 being fed through the conduit 30. The branch 50 may be connected to any suitable source of gas pressure which is greater than the pressure in the flow line 6, such as an oil and gas separator (not shown) when the apparatus 4 is installed a short distance upstream of the separator. Also, a suitable valve 60 is secured in the branch 50 to control the amount of gas which may be injected into the top of the chamber 8. In one embodiment of this invention it is contemplated that the valve 60 be in the form of an inner tube valve, such that the pressure in the top of the chamber 8 may be increased by connecting a suitable tire pump (not shown) to the valve 60 and pumping air into the top of the chamber 8. When the pressure in the top of the chamber 8 has been increased as desired, the tire pump is disconnected from the valve 60 and the valve 60 will retain this desired pressure to force the emulsion breaker 12 downwardly through the conduit 30 into the flow line 6. It will be understood that the valve 38 is closed when gas from an outside source is injected through the branch line 50 to prevent the loss of the gas to the flow line 6.

The operation of the injector 4 is believed apparent, in that the valve 28 is normally open and any free gas in the flow line 6 will tend to rise in the pipe 24, such that the pipe 24 in effect forms a gas reservoir. This gas is transmitted through the conduit 36 and riser 40 into the cover 44 and the top of the chamber 8 to act on the upper surface of the emulsion breaker 12. Thus, the pressure in the top of the chamber 8 will normally be substantially the same as the pressure in the flow line 6 to induce a gravity flow of the emulsion breaker 12 through the conduit 30 and the lower end portion of the pipe 24 to mix with the fluids being forced through the flow line. The amount of emulsion breaker injected into the flow line 6 is controlled by the needle valve 34. In some circumstances, it is desired to provide a higher pressure in the top portion of the chamber 8 than in the flow line 6 to provide a more positive feed of the emulsion breaker 12 through the conduit 30. In this event, the branch 50 of the cover 44 is connected to a suitable source of gas supply and the valve 38 is closed, such that additional gas is injected into the top of the chamber 8.

The emulsion breaker 12 will invariably contain impurities which will collect as a sediment in the bottom of the chamber 8. Therefore, the chamber 8 must be periodically cleaned. Since this sediment will also contain a portion of emulsion breaker 12, I prefer to remove the cover 44 and the riser 40; whereupon the cover 44 is replaced in the position shown in Fig. 1. With the needle valve 34 closed and the valves 38 and 28 open, relatively high pressure gas may be fed through the branch line 50 to, in effect, blow the sediment and remaining emulsion breaker 12 downwardly through the conduit 36 and the pipe 24 into the flow line 6, such that no portion of the emulsion breaker 12 will be wasted. When the chamber 8 has been cleaned, the riser 40 is replaced and a new supply of emulsion breaker 12 injected into the chamber 8 through the inlet 16.

In some operating conditions, such as when the well fluids flowing through the line 6 contain a very minor amount of free gas, the liquid components in these well fluids will tend to rise through the pipe 24, conduit 36 and riser 40. If these liquids enter the chamber 8, they dilute the emulsion breaker 12 and the subsequent injection of the emulsion breaker into the flow line will not be subject to precise control, since the concentration of the emulsion breaker in the chamber 8 will be unknown. Therefore, I provide the orifice 48 in the riser 40 which will tend to restrict the flow of liquid into the chamber 8. Gas in the liquid attempting to flow upwardly through the riser 40 may flow freely on into the upper portion of the chamber 8. Also, I prefer to install a suitable check valve 62 in the flow line 6 downstream of the injector 4 to prevent a possible back flow of oil and water through the line 6 and upwardly through the pipe 24 and conduit 36 into the chamber 8.

A modified injector 64 is illustrated in Fig. 2 and comprises a housing 66 preferably cylindrical in form which provides a chamber 68 for storing a supply of emulsion breaker 70. The housing 66 is supported on the flow line 6 by means of a pipe 72 threadedly secured at its lower end in the T connector 26 and extending upwardly through the housing 66. In other words, the bottom wall of the housing 66 is provided with an aperture through which the pipe 72 is extended, with the pipe 72 being sealed to the lower wall of the housing 66 to prevent leakage of emulsion breaker 70. The upper end of the pipe 72 is suitably secured to the bottom face of the top wall of the housing 66 and is provided with an orifice plate 74 therein to restrict the upward flow of liquid through the pipe 72 in the same manner as the orifice cap 46 in the embodiment shown in Fig. 1. A conduit 76 extends from the top wall of the housing 66 (directly above and in communication with the pipe 72) to another portion of the top wall of the housing 66 to transmit pressure from the pipe 72 to the top portion of the chamber 68. A suitable valve 78 is interposed in the conduit 76 to prevent the flow of gas when desired. Also, branch lines 80, 82 and 84 are provided on the conduit 76 for various purposes. A pressure guage 86 is secured to the branch line 84 to continuously indicate the pressure in the top of the chamber 68 and a suitable valve 88 is secured in the branch line 82 to relieve the pressure in the top portion of the chamber 68 when filling the chamber 68, in the same manner as previously described in connection with Fig. 1. Another valve 90 is connected to the branch line 80 to facilitate the injection of gas from some source other than the flow line 6 into the chamber 68 in the same manner as previously described.

The housing 66 is also provided with a fill plug 92 and drain plug 94 for filling and draining the emulsion breaker 70 from the chamber 68, as well as a suitable sight glass 96 to visually indicate the level of the emulsion breaker 70 in the chamber 68. A conduit 98 is connected at its lower end to the lower portion of the pipe 72 and at its upper end to the lower arm 100 of the sight glass 96. It will therefore be apparent that the conduit 98 provides a passageway for the injection of the emulsion breaker 70 into the flow line 6, much in the same manner as previously described in connection with the conduit 30 in the embodiment shown in Fig. 1. A suitable needle valve 102 and sight glass 104 are interposed in the conduit 98 to control the amount of emulsion breaker fed through the conduit 98 and to visually indicate the emulsion breaker being fed through the conduit 98. As before, the needle valve 102 is normally open only to such an extent that the emulsion breaker 70 will drip through the conduit 98. A valve 106 is interposed in the lower end portion of the pipe 72 below the connection of the conduit 98 to completely isolate the injector 64 from the flow line 6 when, for example, the chamber 68 is being filled with emulsion breaker 70.

The injector 64 operates in substantially the same manner as the injector 4 previously described to utilize the free gas in the well fluid flowing through the flow line 6 to maintain a pressure in the chamber 68 above the emulsion breaker 70 and induce a gravity flow of the emulsion breaker downwardly through the conduit 98 into the flow line 6. Also, the pressure in the chamber 68 may be increased as desired to provide a positive feed of the emulsion breaker 70.

As previously indicated, an emulsion breaker injector constructed in accordance with this invention, as, for example, the injector 4 shown in Fig. 1, may be located adjacent a producing oil well. As long as the particular well is being pumped, gas pressure will be maintained in the top of the chamber 8, either by diverting free gas from the well fluids or by the injection of gas from another source, as previously described. However, when the particular well has been shut down for a period of time, the gas may leak from the top of the chamber 8, and the fluid produced by the well when it is first started may be substantially all oil. In such circumstances, the oil initially forced through the line 6 has a tendency to flow upwardly through the pipe 24 and conduits 30 and 36 into the chamber 8. I therefore contemplate the use of a float valve 108 in the lower portion of the pipe 24 in some installations, as shown in Fig. 3.

The float valve 108 may have any desired construction, such as an enlarged hollow body of a size to be floated by oil entering the lower end of the pipe 24, and a valve head 110 on the upper end thereof. The valve head 110 enters a valve seat 112 suitably secured in the pipe 24 to assure that oil forced into the lower end of the pipe 24 will not flow on upwardly through the conduits 30 or 36. Suitable stops 114 are secured in the pipe 24 below the seat 112 to limit the downward movement of the valve 108 when the pipe 24 is filled with gas.

When the float valve 108 is closed by oil pumped upwardly into the lower portion of the pipe 24, it is apparent that emulsion breaker 12 dripping through the conduit 30 will be stopped at the valve seat 112 and not enter the flow line 6. However, a well of the type previously described will ordinarily start producing some free gas within a relatively short period of time after the well has started producing, such as within one or two hours. This free gas will tend to rise in the pipe 24 around the valve 108 to replace oil standing in the pipe 24 and open the valve 108; whereupon any emulsion breaker standing in the pipe 24 above the seat 112 will drain downwardly into the line 6, and only a minor portion of the fluids produced by the well will not be treated. Also, air may be injected into the lower end of the pipe 24 through a valved conduit 116 located immediately below the seat 112 to open the valve 108 if desired. It will be apparent that when air or any other gas is trapped in the pipe 24, the level of the oil in the pipe 24 will be reduced to (if the gas pressure is sufficient) retain the float valve 108 open.

From the foregoing it will be apparent that the present invention provides a novel device for injecting emulsion breaker into the fluids produced from an oil well without the use of any moving parts and which will require a minimum of attention by the operator of the oil producing lease. The reservoir for the emulsion breaker may be made of any desired size to control the rate at which the reservoir must be refilled with emulsion breaker and further minimize attention by the operator. The force imposed on the emulsion breaker for feeding the emulsion breaker into the well fluids may be controlled as desired to assure that the emulsion breaker will be fed into the well fluids under all operating conditions. It will be further apparent that the present injector is simple in construction, will have a long service life and may be economically manufactured.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:
1. In combination with a flow line through which a mixture of oil, gas and water is pumped and wherein the flow line has a horizontally extending portion; a gas-tight housing for storing a supply of emulsion breaker; means for supporting the housing above the horizontal portion of the flow line; said means including a vertically extending pipe connected to the flow line in communication with the upper interior of the horizontal portion of the flow line to receive free gas from the flow line; a first tube connected to an intermediate portion of said pipe and to the bottom of the housing with the upper end thereof positioned substantially even with the bottom of the housing, a riser threaded in the upper end of said tube and extending upwardly into the upper portion of the housing, a cover threaded into the top of the housing above said riser to facilitate removal of the riser and drainage of the housing through said tube and said pipe into the flow line, a second tube connected to the lower portion of the housing and to said pipe for feeding emulsion breaker from the housing into the flow line, the upper end of said second tube being positioned above the bottom of the housing, and a needle valve in said second tube for regulating the amount of emulsion breaker injected into the flow line.

2. The combination defined in claim 1 characterized further to include a valved conduit connected to said cover for supplying gas to the upper portion of said housing from a separate gas supply.

3. The combination defined in claim 1 characterized further to include an orificed cap on the upper end of said riser.

4. The combination defined in claim 1 characterized further to include a sight glass assembly having upper and lower arms connected to the upper and lower portions of the housing to indicate the level of emulsion breaker in the housing, said second tube being connected to the lower arm of the sight glass assembly and an intermediate portion of said pipe.

References Cited in the file of this patent

UNITED STATES PATENTS 1,606,685    Averill _____ Nov. 9, 1926

OTHER REFERENCES

Shea: Practices and Methods of Preventing and Treating Crude-Oil Emulsions, Bulletin 417 of the Bureau of Mines, 1939, page 38.

Dow: Oil-Field Emulsions, Bulletin 250 of the Bureau of Mines, 1926, pages 50, 51, 52 and 54.

Tret-O-Lite, pamphlet pub. July 1, 1922, by Wm. S. Barnickel & Co. of St. Louis, Mo., pp. 14, 15, and 16 and 17.